(12) United States Patent
Idei et al.

(10) Patent No.: US 7,865,514 B2
(45) Date of Patent: Jan. 4, 2011

(54) COMPUTER SYSTEM AND DATABASE MANAGEMENT METHOD USING THE SAME

(75) Inventors: Hideomi Idei, Kawasaki (JP); Kazuhiko Mogi, Sagamihara (JP); Norifumi Nishikawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 281 days.

(21) Appl. No.: 11/968,681

(22) Filed: Jan. 3, 2008

(65) Prior Publication Data
US 2008/0301151 A1  Dec. 4, 2008

(30) Foreign Application Priority Data
May 31, 2007  (JP) .............................. 2007-146168

(51) Int. Cl.
  *G06F 17/30* (2006.01)
(52) U.S. Cl. ................................... 707/758
(58) Field of Classification Search ........................ 707/2, 707/102, 758; 711/137
  See application file for complete search history.

(56) References Cited

U.S. PATENT DOCUMENTS

| 5,860,142 | A | * | 1/1999 | Cepulis ..................... 711/202 |
| 2005/0203863 | A1 | | 9/2005 | Idei et al. |
| 2005/0267878 | A1 | | 12/2005 | Mogi et al. |
| 2007/0005660 | A1 | | 1/2007 | Idei et al. |
| 2007/0094453 | A1 | * | 4/2007 | Santhanakrishnan et al. ..... 711/137 |

FOREIGN PATENT DOCUMENTS

| JP | 2003-150419 | 5/2003 |
| JP | 2004-192292 | 7/2004 |
| JP | 2005-258735 | 9/2005 |

* cited by examiner

*Primary Examiner*—Etienne P LeRoux
(74) *Attorney, Agent, or Firm*—Brundidge & Stanger, P.C.

(57) ABSTRACT

A pre-fetch server, which is connected to a DB server running a DBMS and to a storage apparatus storing DB data, stores information required for judging whether or not a pre-fetch is effective. Judgment on whether or not the pre-fetch will be effective is performed when a pre-fetch I/O is issued. If the pre-fetch server judges that the pre-fetch will be effective, it issues the pre-fetch I/O to the storage apparatus.

5 Claims, 8 Drawing Sheets

COMPUTER SYSTEM AND DATABASE MANAGEMENT METHOD USING THE SAME

CROSS-REFERENCE TO RELATED APPLICATIONS

This application relates to and claims priority from Japanese Patent Application No. JP2007-146168, filed on May 31, 2007, the entire disclosure of which is incorporated herein by reference.

BACKGROUND

1. Field of the Invention

The present invention relates generally to a computer system (hereinafter referred to as a "DB system") that uses a database (hereinafter, abbreviated as a "DB").

2. Description of Related Art

Currently, there are a lot of DB-based applications, and database management systems (hereinafter abbreviated as "DBMS") for performing DB-related processing and management have been becoming increasingly important.

One feature of a DB is its handling of a large amount of data. Due to this feature, many DB systems using a DBMS have a configuration where a storage apparatus with large-capacity storage areas is connected to a computer running the DBMS, and data is stored in the storage apparatus.

In a system with this kind of configuration, since the data is stored in the storage apparatus, when the computer issues an IO command to the storage apparatus, the computer inevitably accesses a disk (a storage resource) in the storage apparatus. This data-access to the disk requires a mechanical operation such as data-seeking and takes much longer time compared to calculation, data transfer, and the like executed on a CPU or in a memory in the computer.

In that situation, it has been common for the storage apparatus to include a cache memory, and a controller in the storage apparatus stores data read from the disk in the cache memory, so if the same data is accessed later, the controller reads the data from the cache memory instead of the disk.

Also, an arrangement has been proposed in which a storage apparatus detects a sequence of data accesses (sequential access), predicts the data to be accessed next and pre-fetches the predicted data to a cache memory.

JP2003-150419 A discloses a technique in which, in order to increase the speed for accessing data in a database stored in a storage apparatus, the storage apparatus storing the DB data obtains, from the DBMS, DB schema location information, query execution information, and the like that will be needed for pre-fetch, and executes the pre-fetch within the storage apparatus.

In "Evaluation on pre-fetch mechanisms using access plans in high-function disks" (Mukai et. al. 11th Data Engineering Workshop (DEWS 2000): hosted by The Institute of Electronics, Information and Communication Engineers, Data Engineering Technical Group. Collection of papers and Lectures No. 3B-3, issued as a CD-ROM in July, 2000.), improvement of the performance of a DBMS by improving the function of a storage apparatus is discussed, taking as an example a DB using a relational database management system (RDBMS).

If a query processing execution plan in the RDBMS is provided to the storage apparatus as application level knowledge, the storage apparatus can read an index of a certain table in the RDBMS and then judge which block storing data for this table the storage apparatus should access.

In such an arrangement, the DBMS sequentially accesses indexes, and a computer running the DBMS ascertains block groups, each storing data in the tables corresponding to the indexes. By effectively scheduling the access to the block groups, the total access time for accessing data can be shortened.

However, in the above techniques, an existing storage apparatus needs to be greatly modified in order to shorten the time for a DB server to access DB data stored in the storage apparatus.

In light of this background, in the computer system disclosed in JP2005-258735 A, a pre-fetch server connected to a DB server and a storage apparatus obtains, from a DBMS, DB schema location information, query information and the information for the execution of the DBMS that will be needed for pre-fetch, identifies target data to be accessed by the DBMS based on the obtained information, and issues a command (pre-fetch I/O) to the storage apparatus to pre-fetch the target data so that the target data is staged to a cache in advance, thereby shortening the time required for processing an I/O issued from the DB server to the storage apparatus.

However, in the arrangement disclosed in JP2005-258735 A, as the number of queries the DB server needs to simultaneously execute (i.e., the multiplicity of queries) increases, pre-fetch I/Os from the pre-fetch server to the storage apparatus increase in addition to read I/Os from the DB server to the storage apparatus, which may result in the application of an even larger load on the storage apparatus, compared to the arrangement where pre-fetch is not performed.

SUMMARY

It is an object of this invention to provide a computer system that includes a pre-fetch server performing the above-described pre-fetch, the computer system being capable of preventing the increase of load on a storage apparatus even if multiple queries are issued to a DB server.

In order to achieve the above object, in this invention, by judging the effectiveness of pre-fetch I/Os, which conventionally have been issued to the storage apparatus without any restrictions and limitations, and by issuing to the storage apparatus only pre-fetch I/Os that have been judged as effective, the number of pre-fetch I/O issued but not effective is reduced, and the increase of the load on the storage apparatus is prevented.

Specifically, according to an aspect of this invention, a pre-fetch server, which is connected to a DB server running a DBMS and a storage apparatus storing DB data, stores information that will be needed for judging the effectiveness of pre-fetch. With that arrangement, whether or not the pre-fetch will be effective is judged when a pre-fetch I/O is issued, and only pre-fetch I/Os that have been judged as effective in the above judgment is issued to the storage apparatus.

According to the above aspect of this invention, a computer system including a pre-fetch server performing pre-fetch and a database management method that are capable of preventing the increase of the load on a storage apparatus even if multiple queries are issued to a DB server can be provided.

Other aspects and advantages of the invention will be apparent from the following description and the appended claims.

DETAILED DESCRIPTION OF PREFERRED EMBODIMENTS

Embodiments of this invention will be described below with reference to FIGS. 1 to 8. It should be understood that this invention is not limited to these embodiments.

Figure 1:
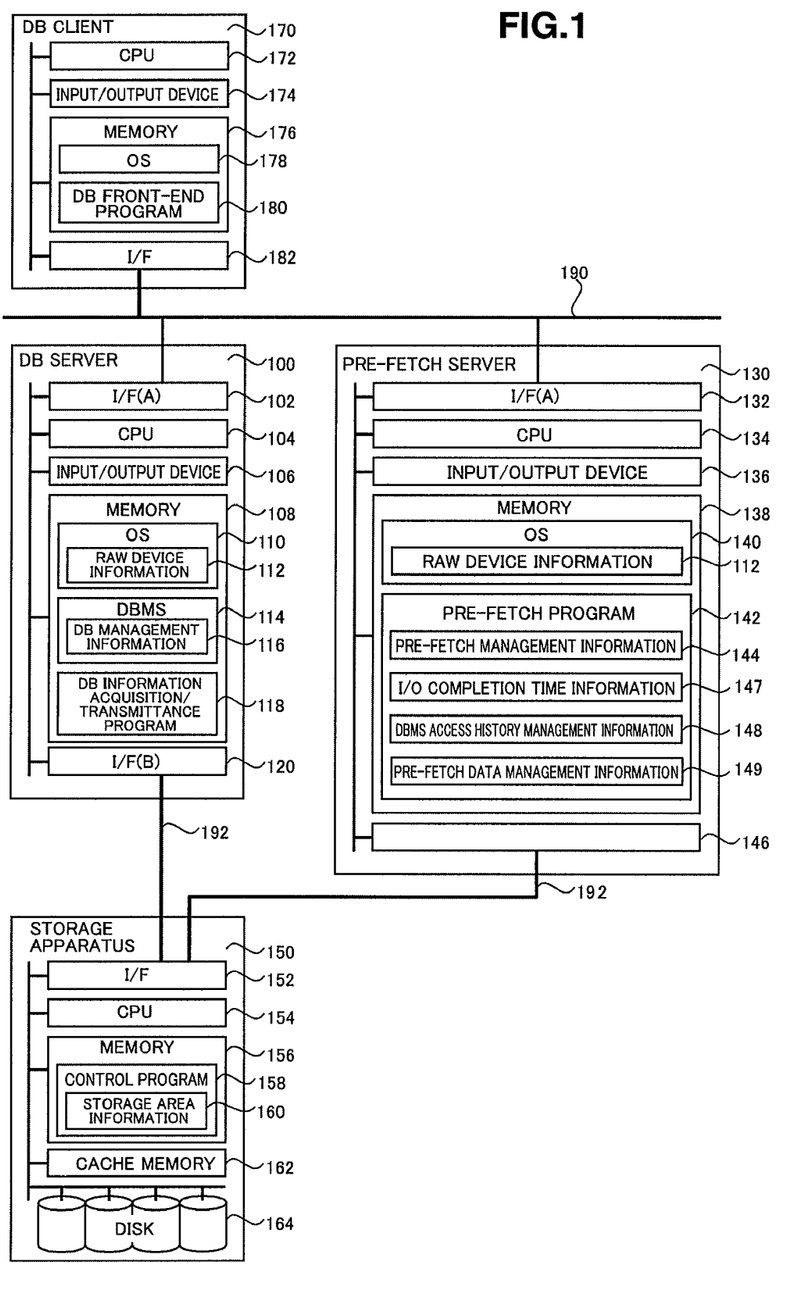
FIG. 1 is a diagram showing an example of a system configuration according to a first embodiment.

A first embodiment of this invention will be described referring to FIGS. 1 to 6. FIG. 1 shows a hardware block diagram for a computer system. This computer system includes: a DB server 100 running a DBMS; a pre-fetch server 130 that predicts data in a storage apparatus 150 storage area that will be accessed by the DB server 100 based on information obtained from the DB server 100 and issues a pre-fetch command to the storage apparatus 150; the storage apparatus 150 that stores data in a database; a DB client 170 that makes a request to the DB server 100 for execution of a query received from a user; a network 190 that connects the DB server 100, the pre-fetch server 130 and the DB client 170 to each other; and a network 192 that connects the DB server 100, the pre-fetch server 130, and the storage apparatus 150 to each other. Although FIG. 1 shows only one unit for each of the DB server 100, the storage apparatus 150 and the DB client 170, a plurality of units may be provided for each.

The DB server 100 is a typical computer, which includes an I/F (A) 102 serving as an interface with the network 190, a CPU (control processing unit) 104, an input/output device 106, a memory 108, and an I/F (B) 120 serving as an interface with the network 192.

The DB server 100's memory 108 stores an operating system (hereinafter, abbreviated as "OS") 110, a DBMS 114 and a DB information acquisition/transmission program 118. The OS 110, the DBMS 114 and the DB information acquisition/transmission program 118 are executed by the CPU 104.

The OS 110 includes a raw device and raw device information 112. The DBMS 114 holds DB management information 116 that will be needed for using and managing a DB. The raw device is a logical memory device managed by the OS. The raw device information 112 associates the raw device included in the OS 110 and storage areas in the storage apparatus 150 that are assigned to that raw device with each other.

The raw device information 112 associates a file name in the raw device and a storage area in the storage apparatus with each other. Assignment of a storage area in the storage apparatus to a file in the raw device is defined by a logical unit number in the storage apparatus and the top logical block address of the logical unit.

Since the DB server 100 and the pre-fetch server 130 need to access the storage areas in the same storage apparatus, the DB server 100 OS 110 and the pre-fetch server 130 OS 140 have common raw device information 112 with common content.

The DB management information 116 is set by an administrator or similar when a DB is initially created. The DB management information 116 includes DB system file information (setting information for a DB system file), data area information (setting information for a data area), DB schema information (setting information for DB schemas such as tables and indexes), and index information (setting information for indexes).

The DB system file information associates the DB system file and the raw device with each other. The DB system file is one large file created in the raw device. The DBMS 114 constructs a DB by writing data in the DB system file. The OS 110 determines, based on the above raw device information 112, the logical storage area in the storage apparatus 150 in which the DB data in the DB system file will be actually written. Based on the determined information, the OS 110 issues a data-write command to the storage apparatus 150.

The data area information is the setting information for the data area managed by the DBMS 114. The data area is an area for storing the DB data and created in the DB system file.

The DB schema information is setting information about the DB schemas, such as tables and indexes, managed by the DBMS 114. The index information is setting information about the indexes in the DB schemas.

The pre-fetch server 130 is a typical computer like the DB server 100, and includes an I/F (A) 132 serving as an interface with the network 190, a CPU (control processing unit) 134, an input/output device 136, a memory 138, and an I/F (B) 146 serving as an interface with the network 192.

The memory 138 stores an OS 140 and a pre-fetch program 142. The OS 140 and the pre-fetch program 142 are executed by the CPU 134. The OS 140 holds the same information as the raw device information 112 of the DB server 112. The pre-fetch program 142 holds the pre-fetch management information 144 that will be needed in the pre-fetch process.

The storage apparatus 150 includes an I/F 152 serving as an interface with the network 192, a CPU (control processing unit) 154, a memory 156, a cache memory 162 and disks 164.

The memory 156 of the storage apparatus 150 stores a control program 158 for controlling the storage apparatus 150. The control program 158 is executed by the CPU 154 and holds storage area information 160 that associates logical storage areas and physical storage areas with one another.

It should be noted that the disks 164 are storage media, and may be hard disk drives or optical discs. The storage apparatus 150 may establish a RAID configuration with the logical storage areas defined by a plurality of disks. Semiconductor memories such as flash memories may be employed in place of the disks.

The storage area information 160 associates logical units—logical storage areas included in the storage apparatus 150—and physical storage areas actually storing data, with one another. The storage area information 160 includes: a logical unit numbers; logical block addresses, i.e., numbers for logical blocks in the logical unit; physical disk numbers for identifying disks containing physical blocks corresponding to the logical block addresses; and physical block addresses, i.e., numbers for physical blocks corresponding to the logical blocks.

The storage apparatus 150 is accessed by the DB server 100 and the pre-fetch server 130 through designation of a logical unit and a logical block address in the storage apparatus 150. Then, the storage apparatus 150 determines, based on the storage area information 160, the physical disk number and the physical block address of the physical block corresponding to that logical unit and logical block, and then actually accesses the physical block.

The DB client 170 is a typical computer like the DB server 100 and the pre-fetch server 130, and includes a CPU (control processing unit) 172, an input/output device 174, a memory 176, and an I/F 182 serving as an interface with the network 190.

The memory 176 stores an OS 178 and a DB front-end program 180.

The OS 178 and the DB front-end program 180 are executed by the CPU 172. When the DB server 100 starts the DBMS 114 or changes the configuration of the DB, it transmits to the pre-fetch server 130 information for the configuration of the DB stored in the storage apparatus 150, especially the storage locations for the DB schemas (which will be referred to as "DB schema location information").

Then, when the DB server 100 receives a query (which relates to operation details for the DB or process details for the DB) from the DB client 170, the DB server 100 transmits information about this query (which will be referred to as "DB process information") to the pre-fetch server 130. Also, when the DB server 100 accesses data in the DB, the DB server 100 transmits information about the DB to be accessed (which will be referred to as "DB access information") to the pre-fetch server 130. The DB server 100 then accesses the storage apparatus 150.

When the DB server 100 receives the query from the DB client 170, the DB information acquisition/transmission program 118 acquires a query plan for the query from the DBMS 114, creates the DB process information and transmits the created DB process information to the pre-fetch server 130. Then, the DB information acquisition/transmission program 118 makes a request to the DBMS 114 for the execution of the received query.

Meanwhile, the pre-fetch server 130 that has received the above information predicts which storage area in the storage apparatus the DB server 100 will access, based on the received information. Then, the pre-fetch information 130 creates a pre-fetch command based on the prediction result and transmits the pre-fetch command to the storage apparatus 150. When receiving the pre-fetch command, the storage apparatus 150 reads data from the storage area designated by the pre-fetch command and stores the data in the cache memory 162.

The pre-fetch management information 144 includes DB schema location information (logical location information for each DB schema) and DB process information (information about the execution of queries). The schema location information includes: a DBMS ID for identifying a DBMS 114 that has a DB schema; a DB schema ID for identifying the DB schema; the type of the DB schema; the file name in the raw device in which the DB schema is written; the logical unit number of the storage apparatus 150 in which the DB schema is written; and the logical unit address of the storage apparatus 150 in which the DB schema is written. The DBMS ID is a unique value that has been assigned in advance to each DBMS 114 by an administrator or similar.

When the DB server 100 executes the DB information acquisition/transmission program 118, the DB server 100 acquires the DB schema location information from the OS 110 and the DBMS 114, and transmits the DB schema location information to the pre-fetch server 130. The DB information acquisition/transmission program 118 creates the DB schema location information (or collects information for constructing the DB schema location information) based on the content of the DB management information 116 and the raw device information 112, which are stored in the DB server 100, and the DBMS ID information, and transmits the DB schema location information to the pre-fetch server 130. Transmission is conducted when starting the DBMS 114, and when changing the configuration of the DB.

The DB process information is information about a query executed by the DBMS 114 and about retrieval executed by that query (i.e., a table scan or an index scan, hereinafter referred to as a "scan"). The DB process information includes: a DBMS ID for identifying a DBMS 114 that executes a query; a query ID for identifying the query to be executed; a scan ID for identifying a scan to be executed in the query; a DB schema ID for identifying the DB schema to be accessed by the scan; and the type of the scan. The DB information acquisition/transmission program 118 acquires from the DBMS 114 the DB process information for the query received from the DB client 170 and transmits the DB process information to the pre-fetch server 130.

The DB access information is information to be used when the DBMS 114 accesses the DB data. The DB access information includes: a DBMS ID for identifying a DBMS 114 that executes a query; a query ID for identifying the query to be executed; the type of scan to be executed; the logical unit number in the storage apparatus 150 that stores data to be accessed; the logical block address in the storage apparatus 150 that stores data to be accessed; and the size of the data to be accessed. The DB access information is created every time the DBMS 114 accesses the DB data and transmits the DB data to the pre-fetch server 130.

The pre-fetch command issued by the pre-fetch server 130 to the storage apparatus 150 is information showing the location of pre-fetch target data. The pre-fetch command includes: a number for the logical unit in the storage apparatus 150 that stores the pre-fetch target data; an address of the logical block in the storage apparatus 150 that stores the pre-fetch target data; and the size of the pre-fetch target data.

When receiving the pre-fetch command, the storage apparatus 150 determines the physical location of the relevant data based on the storage area information 160 and reads it out to the cache memory 162. Then, when receiving a command to access the DB, the storage apparatus 150 transmits the data that has been read out to the cache memory 162 to the DB server 100.

The pre-fetch program 142 running on the pre-fetch server 130 also holds I/O completion time information 147, DBMS access history management information 148 and pre-fetch data management information 149.

Figure 2:
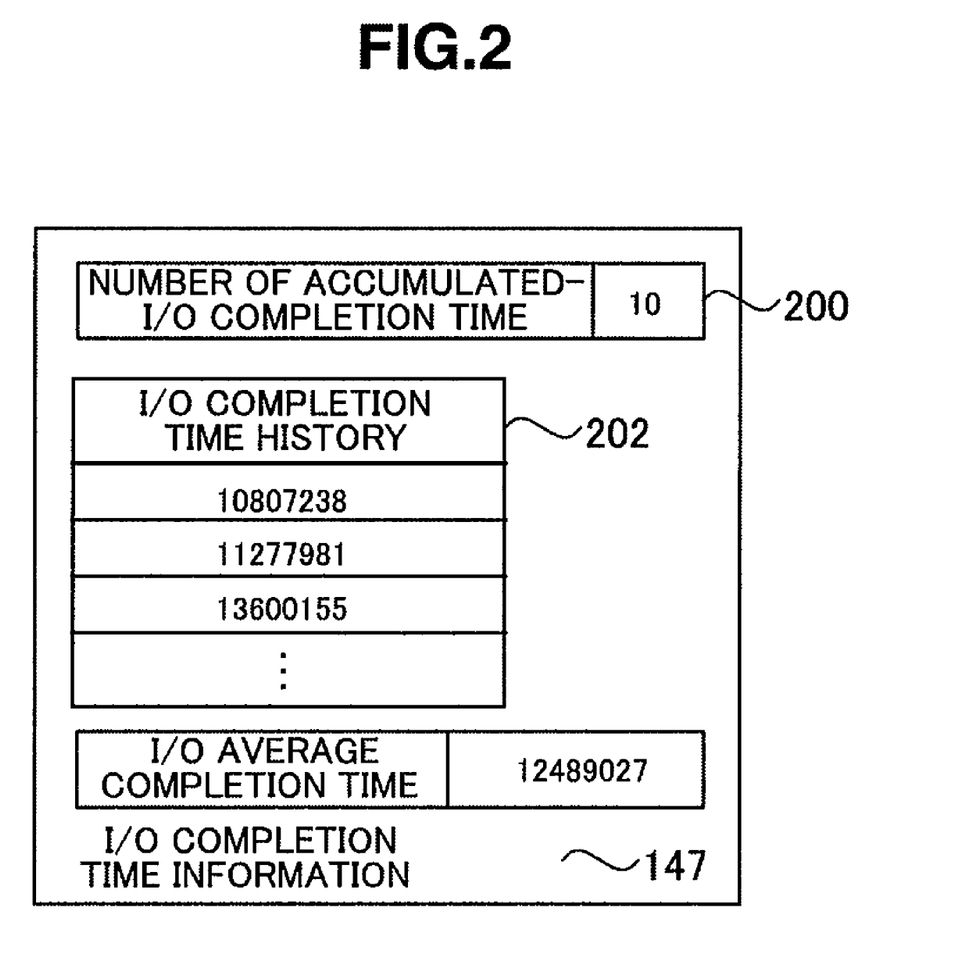
FIG. 2 is a diagram showing an example of the configuration of I/O completion time information.

FIG. 2 is a diagram showing an example of the configuration of the I/O completion time information 147 stored in the pre-fetch program 142 in the pre-fetch server 130. The I/O completion time information 147 is information for managing the time taken from the point in time when the pre-fetch server issues a pre-fetch I/O to the storage apparatus 150 to the point in time when the pre-fetch is completed. This information has a field 200 for entering the number of accumulated-I/O completion times, a field 202 for entering an I/O completion time history, and a field 204 for entering an I/O average completion time.

The number of accumulated-I/O completion times 200 in FIG. 2 is information showing the accumulated number of I/O completion times as the history of the I/O completion times, which may be set in the pre-fetch program 142 or applied as an external parameter by an administrator when the pre-fetch program 142 is started.

Each I/O completion time in the I/O completion time history 202 expresses, as the difference between time-stamps, the time taken from the point in time when the pre-fetch server 130 issues a pre-fetch I/O to the storage apparatus 150 to the point in time when a response for the above pre-fetch I/O is sent from the storage apparatus 150 to the pre-fetch server 130. The I/O completion time history 202 contains as many past I/O completion times as the number indicated by the number of accumulated-I/O completion times, starting from the latest one.

The I/O average completion time 204 is a value obtained by dividing, by the number of accumulated-I/O completion times, a value obtained by adding all I/O completion times in the I/O completion time history 202 when a new I/O completion time is added or a change is made to the I/O completion time history 202.

Figure 3:
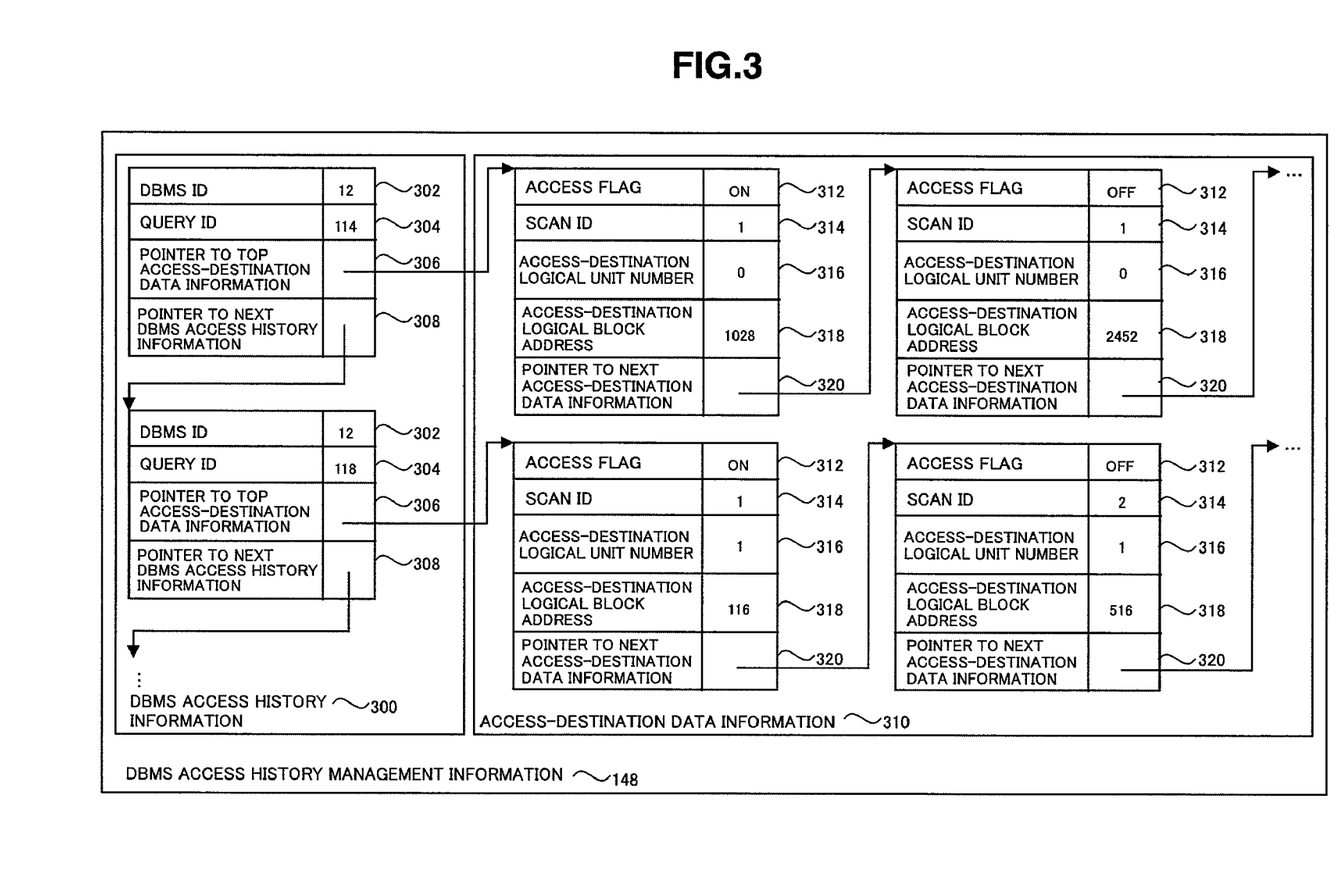
FIG. 3 is a diagram showing an example of the configuration of DBMS access history management information.

FIG. 3 is a diagram showing an example of the configuration of the DBMS access history management information 148 stored in the pre-fetch program 142 in the pre-fetch server 130. The DBMS access history management information 148 manages how the DBMS 114 accesses the storage apparatus 150. The DBMS access history management information 148 includes DBMS access history information 300 and access-destination data information 310. The pre-fetch program 142 refers to the access history management information 148 and executes the pre-fetch process.

The DBMS access history information 300 includes a field 302 for entering a DBMS ID, a field 304 for entering a query ID, a field 306 for entering a pointer to the top of the access-destination data information 310, and a field 308 for entering a pointer to the next DBMS access history information 300.

As many pieces as DBMS access history information 300 as the number of queries to be pre-fetched are created, and the pieces of the DBMS access history information 300 are associated with each other by the pointer 308 to the next DBMS access history information.

The access-destination data information 310 includes a field 312 for entering an access flag, a field 314 for entering a scan ID, a field 316 for entering an access-destination logical unit number, a field 318 for entering an access-destination logical block address, and a field 320 for entering a pointer to the next access-destination data information 310.

The access-destination data information 310 is created when the pre-fetch program 142 identifies pre-fetch target data during the pre-fetch process, and the created access-destination data information 310 is entered as access-destination data information for corresponding DBMS 114 access history information 300.

If plural pieces of access-destination data information 310 are created, the plural pieces of information are associated with each other by the pointer 320 to the next access-destination data information 310 in order of access by the DBMS 114. The access flag 312 is information showing whether or not the DBMS 114 has accessed the storage area indicated by this flag, and the initial value of the access flag is OFF. Based on the DB access information transmitted when the DBMS 114 accesses data in the DB, corresponding access-destination data information 310 is identified and the access flag for this access-destination data information is turned ON.

The identification of the corresponding access-destination data information 310 uses the scan ID 314, the access-destination logical unit number 316 and the access-destination logical block address 318. Access-destination data information 310 that has been kept for a certain time period and is no longer necessary may be deleted.

The pre-fetch program 142 in the pre-fetch server 130 creates the DBMS access history management information 148 shown in FIG. 3, based on the DB process information transmitted from the DB server 100. Regarding the DBMS access history information 300 identified by the DBMS ID and the query ID, the DBMS 114 accesses the DB based on the access-destination data information 310 in order of association by the pointer. When the DBMS 114 completes access to the DB based on first DBMS access history information identified by the DBMS ID and the query ID, the DBMS 114 accesses the DB based on second DBMS access history information.

Figure 4:
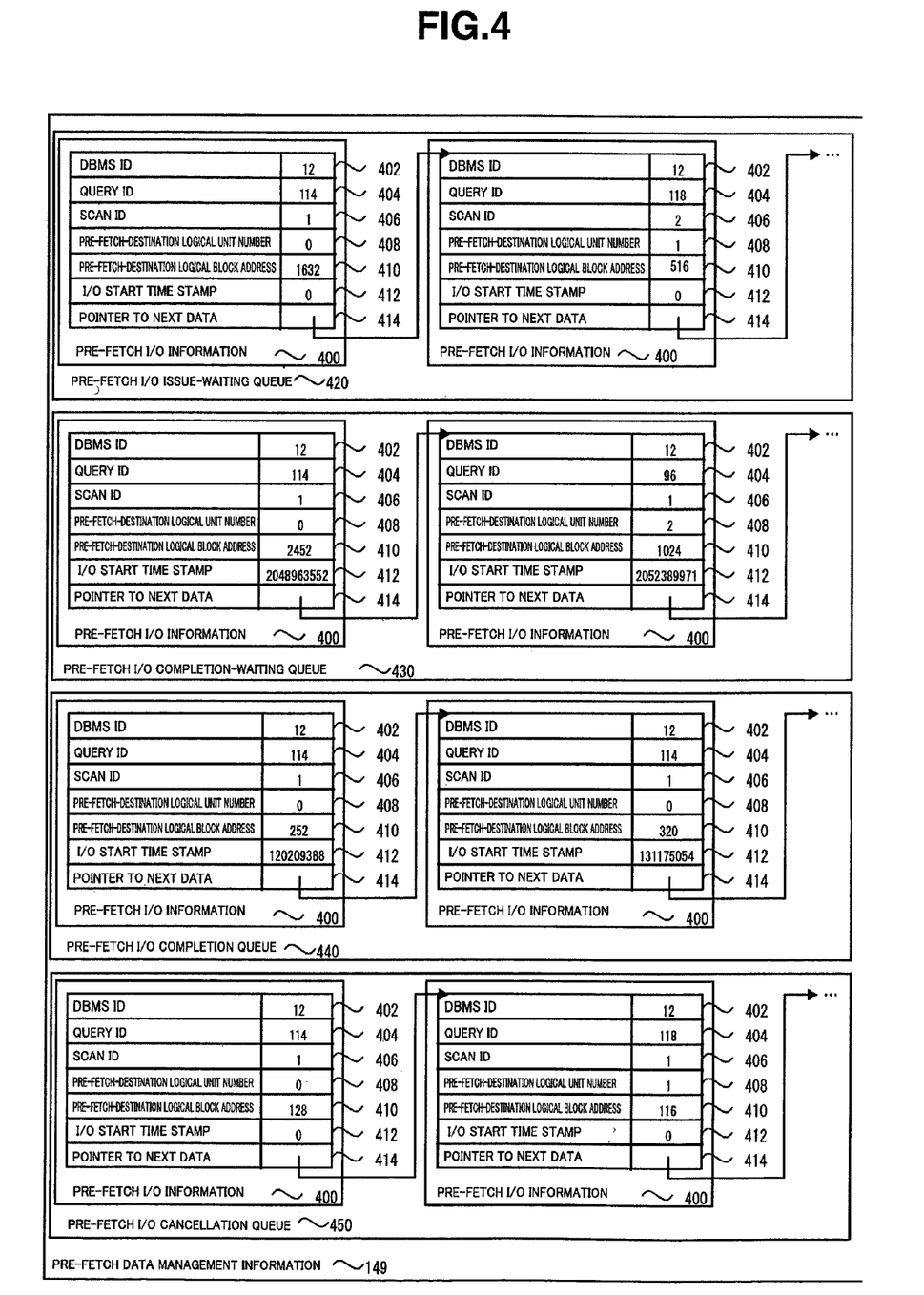
FIG. 4 is a diagram showing an example of the configuration of pre-fetch data management information.

FIG. 4 is a diagram showing an example of the configuration of the pre-fetch data management information 149 stored in the pre-fetch program 142 in the pre-fetch server 130.

The pre-fetch data management information 149 includes a pre-fetch I/O issue-waiting queue 420, a pre-fetch I/O completion-waiting queue 430, a pre-fetch I/O completion queue 440 and a pre-fetch I/O cancellation queue 450. Pieces of pre-fetch I/O information 400 are added to the end of each queue depending on the status of the queue.

The pre-fetch I/O information 400 includes a field for entering a DBMS ID, a field 404 for entering a query ID, a field 406 for entering a scan ID, a field 408 for entering a pre-fetch-destination logical unit number, a field 410 for entering a pre-fetch-destination logical block address, and a field 412 for entering a pointer to next pre-fetch I/O information 400.

When the pre-fetch program 142 identifies pre-fetch target data during the pre-fetch process, it creates the pre-fetch I/O information 400 as information corresponding to the identified data and queues it at the end of the pre-fetch I/O issue-waiting queue 420.

Here, the order of queuing corresponds to the order of access by the DBMS 114. Alternatively, it may be so arranged that a priority is set for each data and queuing is performed in descending order of priority. For example, if the priority of an index leaf page as a starting point for the pre-fetch is set to the highest, the pre-fetch program 142 of the pre-fetch server 130 issues to the storage apparatus 150 a pre-fetch I/O for the index leaf page earlier than for other data.

If plural pieces of pre-fetch I/O information 400 are being queued in the pre-fetch I/O issue-waiting queue 420, the pre-fetch program 142 executes pre-fetch effectiveness prediction process (described later) from the top pre-fetch I/O information 400 in the queue. When judging that the pre-fetch will be effective, the pre-fetch program 142 issues a pre-fetch I/O, de-queues the relevant pre-fetch I/O information 400 from the pre-fetch issue-waiting queue 420, and queues it onto the end of the pre-fetch completion-waiting queue 430.

When the pre-fetch I/O is completed, the pre-fetch program 142 de-queues the relevant pre-fetch I/O information 400 from the pre-fetch I/O completion-waiting queue 430 and queues it onto the end of the pre-fetch I/O completion queue 440.

When judging that the pre-fetch will be effective in the pre-fetch effectiveness prediction process, the pre-fetch program 142 does not issue a pre-fetch I/O, de-queues the relevant pre-fetch I/O information 400 from the pre-fetch I/O issue-waiting queue 420 and queues it onto the pre-fetch I/O cancellation queue 450.

Pre-fetch I/O information 400 that has been kept in the pre-fetch completion queue 440 or the pre-fetch cancellation queue 450 for a certain period of time and is no longer necessary may be deleted.

The pre-fetch program 142 refers to the DBMS access history management information 148 shown in FIG. 3, creates pre-fetch I/O information 400 at random, and stores the created pre-fetch I/O information 400 in the pre-fetch I/O issue queue 450. Each queue in FIG. 4 is formed in a predetermined area in the memory 138 of the pre-fetch server 130.

Processing sequences for a process for issuing a pre-fetch I/O (hereinafter referred to as a pre-fetch I/O issue process) and a process for predicting the effectiveness of the pre-fetch (hereinafter referred to as a pre-fetch effectiveness prediction process), which are performed in the pre-fetch process executed by the pre-fetch program 142 will be described below. It should be understood that, in the below description, when a program or a process is presented as a subject, the actual agent of action is a CPU that executes that program or process.

Figure 5:
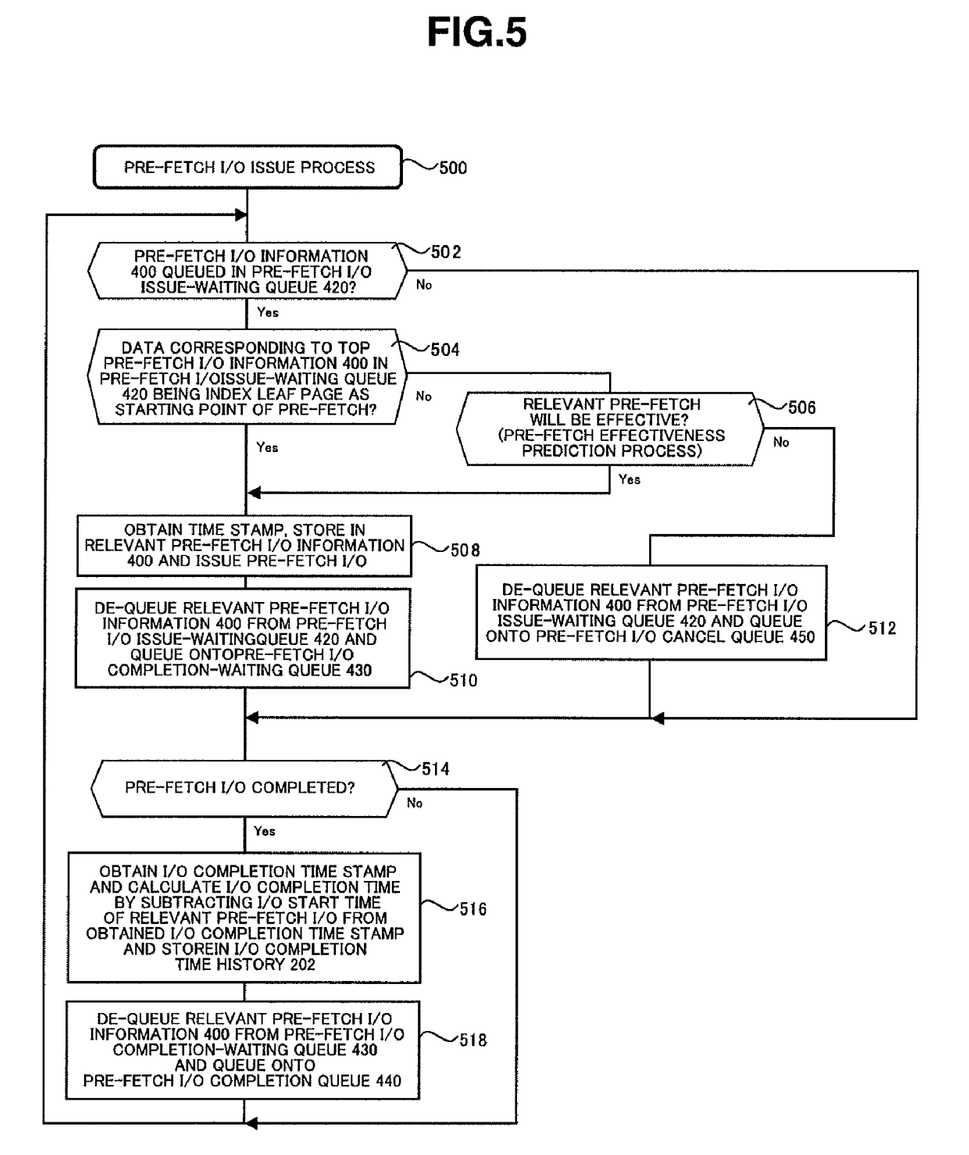
FIG. 5 is a flowchart showing an example of a processing sequence of a pre-fetch I/O issuing process.

FIG. 5 is a flowchart showing a processing sequence example for the pre-fetch I/O issue process. In the pre-fetch I/O issue process 500, the pre-fetch program 142 refers to the pre-fetch I/O issue-waiting queue 420 and judges whether or not any pre-fetch I/O information 400 is queued in the pre-fetch I/O issue-waiting queue 420 (step 502).

If the pre-fetch program 142 determines that pre-fetch I/O information 400 is queued in the pre-fetch I/O issue-waiting queue 420 in step 502, it reads out the top pre-fetch I/O information 400 queued in the pre-fetch I/O issue-waiting queue 420, retrieves pre-fetch management information 144 based on data contained in this I/O pre-fetch information 400, and judges whether or not this data is an index leaf page as a starting point of the pre-fetch (step 504).

If the above data is determined not to be the index leaf page as the starting point of the pre-fetch in step 504, the pre-fetch program 142 executes a later-described pre-fetch effectiveness prediction process 600 and judges whether or not the pre-fetch I/O will be effective (step 506)

If it is determined that the above data is determined to be the index leaf page as the starting point of the pre-fetch in step 504, or if it is determined that the execution of the pre-fetch will be effective in step 506, the pre-fetch program 142 obtains a time stamp when the judgment is made and stores this time stamp as an I/O start time stamp 412 for the pre-fetch I/O information 400. Then, the pre-fetch program 142 issues a pre-fetch I/O to the storage apparatus 150 (step 508).

Next, the pre-fetch program 142 de-queues this pre-fetch I/O information 400 from the pre-fetch I/O issue-waiting queue 420, and queues it in the pre-fetch I/O completion-waiting queue 430 (step 510).

If it is determined in step 506 that the execution of the pre-fetch will not be effective, the pre-fetch program 142 de-queues the pre-fetch I/O information 400 relevant to the judgment from the pre-fetch issue-waiting queue 420 and queues it onto the pre-fetch cancellation queue 450 (step 512).

If pre-fetch I/O information 400 is not queued in the pre-fetch I/O issue-waiting queue 420 in step 502, or after executing the processing of steps 504 to 512, the pre-fetch program 142 judges whether or not a previously-issued pre-fetch I/O has been completed (step 514).

If it is determined that the previously-issued pre-fetch I/O has been completed in step 514, the pre-fetch program 142 retrieves and reads out the relevant pre-fetch I/O information 400 from the pre-fetch completion queue 430, obtains a time stamp when the previously-issued pre-fetch I/O was completed, and calculates the difference from the value contained in the I/O start time stamp 412. Based on that difference, the pre-fetch program 142 determines the I/O completion time and stores it in the I/O completion time history 202 (step 516).

Subsequently, the pre-fetch program 142 de-queues the pre-fetch I/O information 400 retrieved in step 516 from the pre-fetch-completion waiting queue 430 and queues it on the pre-fetch I/O completion queue 440 (step 518). After this step, the pre-fetch program 142 repeats the processing in steps 502 to 518.

Figure 6:
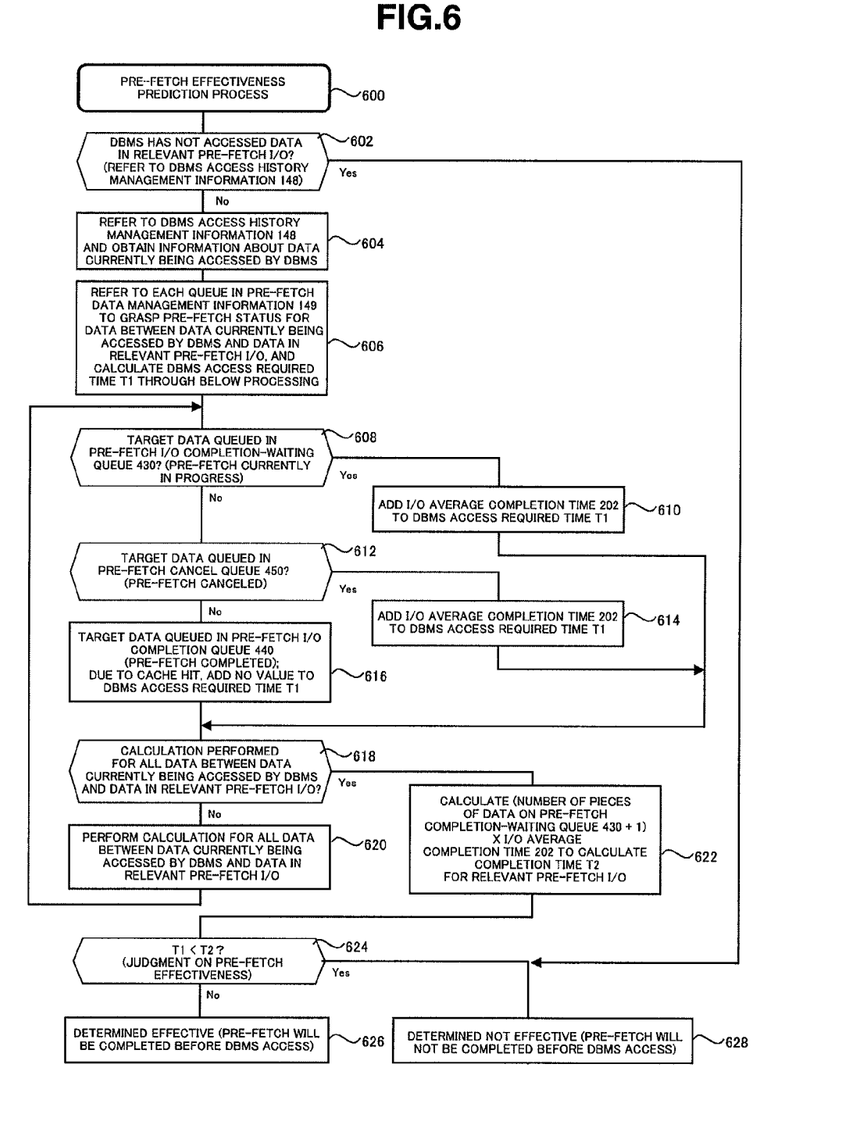
FIG. 6 is a flowchart showing an example of a processing sequence of a pre-fetch effectiveness prediction process.

FIG. 6 is a flowchart showing a processing sequence example for the pre-fetch effectiveness prediction process. The pre-fetch effectiveness prediction process 600 is executed, where pre-fetch I/O information 400 is queued in the pre-fetch issue-waiting queue 420; and pre-fetch target data identified by the top pre-fetch I/O information 400 in the pre-fetch issue-waiting queue 420 is not an index leaf page as a start point of pre-fetch, in the above pre-fetch I/O issue process 500.

In the pre-fetch effectiveness prediction process 600, the pre-fetch program 142 retrieves DBMS access history management information 148 and judges whether or not the DBMS 114 has accessed the pre-fetch target data identified by the pre-fetch I/O information 400 (step 602).

If it is determined that the DBMS 114 has not accessed the pre-fetch target data in step 602, the pre-fetch program 142 retrieves the DBMS access history management information 148 again and reads out access-destination data information 310 for the data last-accessed or currently being accessed by the DBMS 114 at this point in time (step 604).

Next, the pre-fetch program 142 refers to each queue in the pre-fetch data management information 149 to grasp the pre-fetch status of data to be accessed by the DBMS between the data in the access-destination data information 310 read out by the DBMS in step 604 and the pre-fetch target data identified by the pre-fetch I/O information 400. Then, the pre-fetch program 142 calculates a DBMS access-required time T1 in the processing in steps 608 to 620 shown below (step 606).

The pre-fetch program 142 judges whether or not the target data is queued in the pre-fetch I/O completion-waiting queue 430 (step 608). If it is determined that the target data is queued in the pre-fetch I/O completion-waiting queue 430, which means the pre-fetch is currently being performed, the pre-fetch program 142 adds the I/O average completion time 202 to an accumulated time (T1), which is the time required until the DBMS 114 accesses pre-fetch target data (step 610).

The pre-fetch program 142 judges whether or not the target data is queued in the pre-fetch I/O cancellation queue 450. If it is determined that the target data is queued in the pre-fetch I/O cancellation queue 450, which means the pre-fetch has not been performed, the DBMS 114 has to access this data, so the pre-fetch program 142 adds the I/O average completion time 202 to the DBMS access-required time T1 (step 614).

If the determination results in both of the steps 608 and 612 being "no", which means the target data has been queued in the pre-fetch I/O completion queue 440, the pre-fetch target data has been pre-fetched already. This status is a cache hit, so the pre-fetch program 142 does not perform any addition to the DBMS access-required time T1 (step 616).

The pre-fetch program 142 judges whether or not the processing in steps 608 to 616 has been performed for all target data that should be checked for calculating the DBMS access-required time T1 (step 618). If data that should be checked remains, the pre-fetch program 142 performs the processing in steps 608 to 616 for the remaining data (step 620).

If it is determined that the processing of steps 608 to 616 has been performed for all the target data for calculating the DBMS access-required time T1 in step 618, the pre-fetch program 142 counts the number of pieces of pre-fetch I/O information 400 that are queued in the pre-fetch I/O completion-waiting queue 430 and calculates a pre-fetch completion time T2 of the relevant pre-fetch I/O by multiplying a value that has been obtained by adding 1 to the counted number by the I/O average-required time 202 (step 622).

Next, the DBMS access-required time T1 calculated in the processing in steps 608 to 616 is compared with the I/O pre-fetch completion time T2 calculated in step 622 (step 624). If the I/O pre-fetch completion time T2 is equal to or shorter than the DBMS access-required time T1, the relevant pre-fetch I/O is judged as effective (i.e., the pre-fetch can be completed before the DBMS's access) (step 626).

If the I/O pre-fetch completion time T2 is longer than the DBMS access-required time T1 in step 624, or if it is determined that the DBMS 114 has already accessed the data in step 602, the relevant pre-fetch I/O is judged as not effective (i.e., the pre-fetch cannot be completed before the DBMS's access) (step 628).

By predicting the pre-fetch effectiveness through the above processing and issuing a pre-fetch I/O that will be effective (i.e., a pre-fetch I/O that can complete the pre-fetch before the DBMS's access), the number of I/Os to be issued to the storage apparatus 150 can be reduced, thereby preventing the increase of the load to the storage apparatus 150.

However, in the above first embodiment of this invention, since the above pre-fetch effectiveness prediction process is performed every time the pre-fetch server 130 issues the pre-fetch I/O to the storage apparatus 150, it is highly probable that a large part of the CPU resources in the pre-fetch server 130 is consumed, which may adversely affect the pre-fetch process itself. Under such circumstances, a processing sequence for simplifying the pre-fetch effectiveness prediction process while avoiding the consumption of a large part of the CPU resources in the pre-fetch server 130 will be described as a second embodiment.

In the above first embodiment, when the pre-fetch program 142 identifies pre-fetch target data during the pre-fetch process, creates the pre-fetch I/O information 400 and queues it onto the pre-fetch issue-waiting queue 420, the pre-fetch program 142 performs the queuing in the order of access by the DBMS 114. In the second embodiment, however, the pre-fetch program 142 performs the queuing in the reverse order of the order of access by the DBMS 114. In the pre-fetch effectiveness prediction process, the pre-fetch program 142 retrieves the DBMS access history management information 148, judges whether or not the DBMS 114 has accessed pre-fetch target data identified by the pre-fetch I/O information 400 and determines that the pre-fetch will be effective (i.e., the pre-fetch can be completed before the DBMS's access) when the DBMS 114 has not accessed the above data, or determines that the pre-fetch will not be effective (i.e., the pre-fetch cannot be completed before the DBMS's access) when the DBMS 114 has already accessed the above data.

Figure 7:
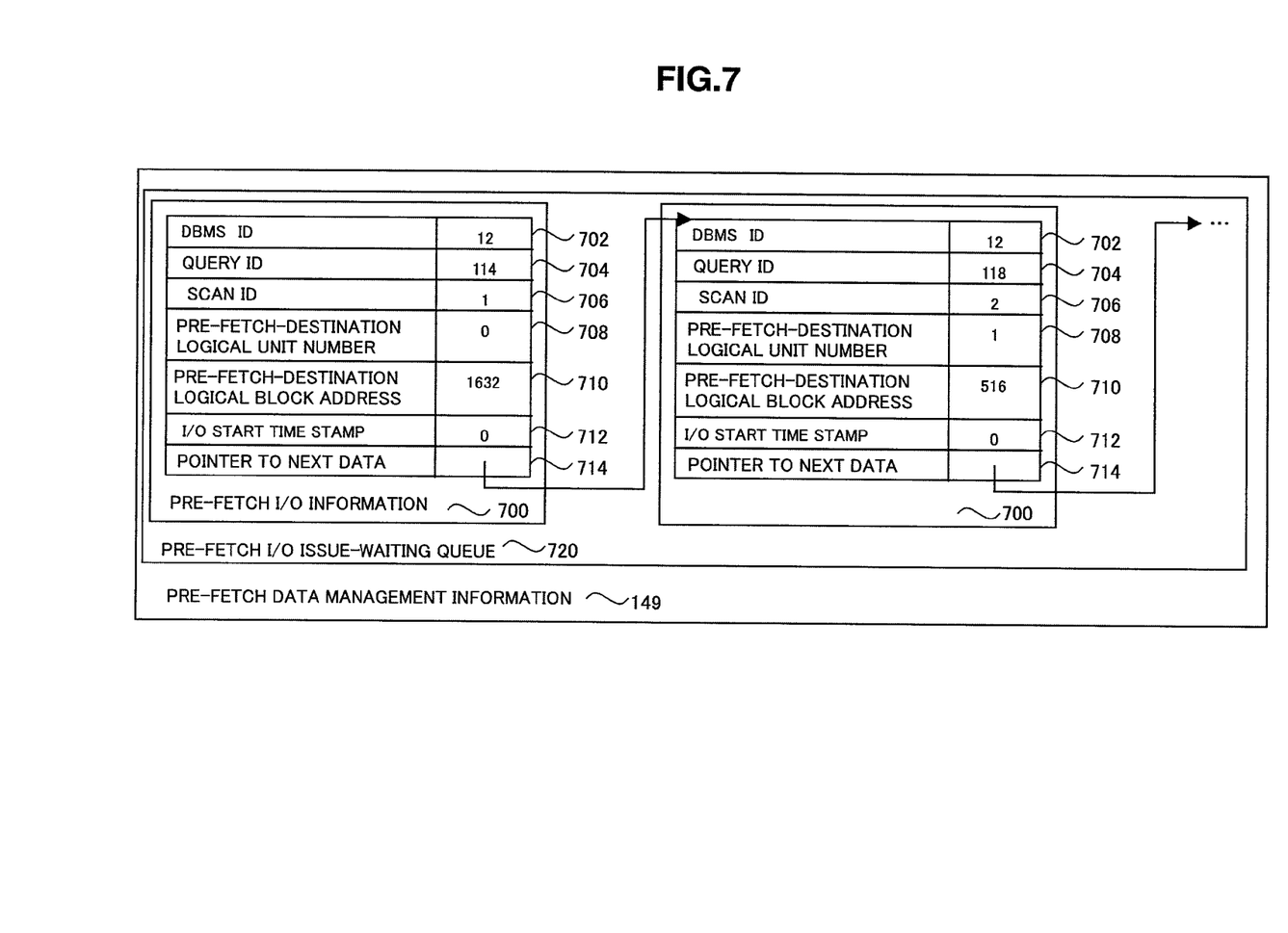
FIG. 7 is a diagram showing an example of the configuration of pre-fetch data management information according to a second embodiment.

FIG. 7 is a diagram showing an example of the configuration of pre-fetch data management information 149 according to the second embodiment. In the pre-fetch effectiveness prediction process according to the second embodiment, since the status of the pre-fetch target data does not have to be managed, the pre-fetch data management information 149 requires to include only a pre-fetch I/O issue-waiting queue 720. Here, the configuration of pre-fetch I/O information 700 to be queued in the pre-fetch I/O issue-waiting queue 720 is the same as the pre-fetch I/O information 400 in the first embodiment.

Figure 8:
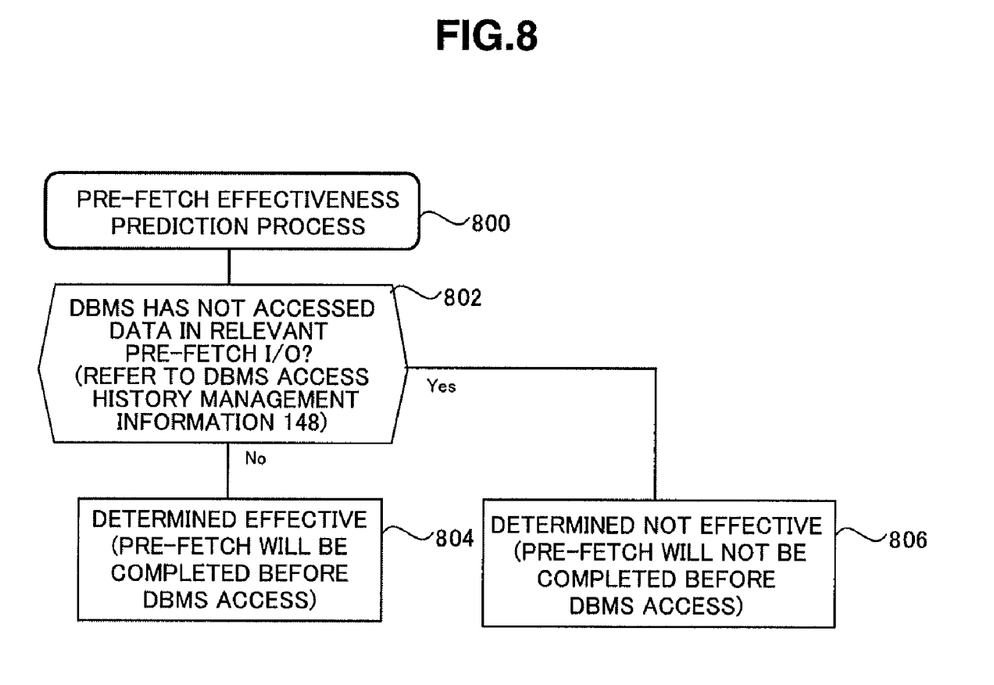
FIG. 8 is a flowchart showing an example of the configuration of a pre-fetch effectiveness prediction process according to the above second embodiment.

FIG. 8 is a flowchart showing a processing sequence in the pre-fetch effectiveness prediction process of the second embodiment.

In a pre-fetch effectiveness prediction process 800, the pre-fetch program 142 retrieves the DBMS access history management information 148 described above and judges whether or not the DBMS 114 has accessed the pre-fetch target data identified by the pre-fetch I/O information 400 (step 802).

If it is determined that the DBMS 114 has not accessed the data in step 802, the pre-fetch is judged as effective (i.e., the pre-fetch can be completed before the DBMS's access) (step 804). On the other hand, if it is determined that the DBMS 114 has already accessed the data, the pre-fetch is judged as not effective (i.e., the pre-fetch cannot be completed before the DBMS's access) (step 806).

Due to the above processing sequence, the effectiveness of pre-fetch can be determined through fewer steps than those of the processing sequence of the first embodiment, and also the consumption of the CPU resource in the pre-fetch server 130 can be reduced. However, since the judgment on the effectiveness of pre-fetch is made based on the judgment of whether or not the DBMS 114 has accessed the data, even if the pre-fetch is performed based on the determination that the pre-fetch can be completed before the DBMS's access, it is likely that the DBMS 114 accesses the data before the pre-fetch is completed. Therefore, the accuracy of the pre-fetch effectiveness prediction is slightly lower than in the first embodiment.

Although the I/O completion time is calculated in the pre-fetch server 130 in the above first and second embodiments, a new interface may be provided to directly obtain the I/O completion time from the storage apparatus 150. The processing in the first embodiment and the processing in the second embodiment may be performed while being switched from one to the other, depending on the multiplicity of queries or similar Even when the pre-fetch server checks the parameter of the storage apparatus 150 and judges that the pre-fetch will be effective, the pre-fetch server 130 may cancel the pre-fetch in a situation where the storage apparatus is busy or the like.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A computer system, comprising:
   a first computer that includes a database management program;
   a storage apparatus that includes a database that can be accessed by the database management program, the storage apparatus connected to the first computer; and
   a second computer that is connected to the first computer and the storage apparatus, the second computer issuing to the storage apparatus a command for commanding the storage apparatus to pre-fetch data in the database before the database management program accesses the data so that the storage apparatus receiving this command provides the pre-fetched data to the first computer,
   wherein the second computer includes:
   a first circuit that commands, when the first computer accesses the data in the database, the storage apparatus to pre-fetch the data stored in the database based on information about the access; and
   a second circuit that judges, when the pre-fetch is commanded, whether or not the pre-fetch will be effective, and issues the command for the pre-fetch to the storage apparatus when the pre-fetch will be effective,
   wherein the second circuit predicts a first required time—the time required until the pre-fetch of the pre-fetch target data is completed, and a second required time—the time required until the database management program accesses the pre-fetch target data, and
   wherein the second circuit compares the first required time and the second required time to judge the effectiveness of the pre-fetch.

2. The computer system according to claim 1, wherein if the second circuit determines that the first required time is greater than the second required time, the second computer does not issue the command for the pre-fetch to the storage apparatus.

3. The computer system according to claim 1, wherein the second circuit uses, for predicting the second required time required until the database management program accesses pre-fetch target data, the following information:
   information about the history of access from the database management program to the database;
   information about the current status of the pre-fetch target data; and
   information about the required time until the pre-fetch is completed.

4. The computer system according to claim 1, wherein the second circuit uses, for predicting the first required time required until the pre-fetch of the pre-fetch target data is completed, the following information:
   information about the status of the pre-fetch target data; and
   information about the required time required until the pre-fetch is completed.

5. The computer system according to claim 1, wherein the first circuit commands, when the pre-fetch target data is identified, the pre-fetch in a reverse order of an order of access by the database management program, and
   wherein the second circuit judges the effect of the pre-fetch based on whether or not the database management program has accessed the pre-fetch target data.

* * * * *